(12) United States Patent
Kim et al.

(10) Patent No.: US 9,651,844 B2
(45) Date of Patent: May 16, 2017

(54) REVERSIBLE ELECTROCHEMICAL MIRROR

(71) Applicant: ELECTRONICS AND TELECOMMUNICATIONS RESEARCH INSTITUTE, Daejeon (KR)

(72) Inventors: Tae-Youb Kim, Daejeon (KR); Chil Seong Ah, Daejeon (KR); Seong-Mok Cho, Daejeon (KR); Hojun Ryu, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 92 days.

(21) Appl. No.: 14/747,978

(22) Filed: Jun. 23, 2015

(65) Prior Publication Data

US 2016/0154288 A1    Jun. 2, 2016

(30) Foreign Application Priority Data

Nov. 27, 2014  (KR) .................. 10-2014-0167573

(51) Int. Cl.
  *G02F 1/153*  (2006.01)
  *G02F 1/15*  (2006.01)

(52) U.S. Cl.
  CPC .......... *G02F 1/1533* (2013.01); *G02F 1/1506* (2013.01)

(58) Field of Classification Search
  CPC .......... G02F 1/155; G02F 1/157; G02F 1/153; G02F 1/163; G02F 1/1523; G02F 1/161; G02F 1/15; G02F 1/1533; G02F 1/1525; G02F 2001/1555; G02F 2001/1515; G02F 1/1506; G02F 1/1521; G02F 2001/1519; G02F 2001/1536; G02F 1/13338
  USPC ........................................... 359/270
  See application file for complete search history.

(56) References Cited

U.S. PATENT DOCUMENTS

| 5,923,456 | A  |   | 7/1999 | Tench et al. |
| 6,256,135 | B1 | * | 7/2001 | Tench .............. G02F 1/1506 359/265 |
| 6,400,491 | B1 | * | 6/2002 | Tench .............. G02F 1/21 204/157.15 |

(Continued)

FOREIGN PATENT DOCUMENTS

| KR | 10-0608529 B1 | 8/2006 |
| WO | WO 00/36580   | 6/2000 |

OTHER PUBLICATIONS

Tae-Youb Kim et al., "Electrochromic device for the reversible electrodeposition system", Journal of Information Display, Mar. 18, 2014, pp. 13-17, vol. 15, No. 1, Taylor & Francis Group.

(Continued)

*Primary Examiner* — Scott J Sugarman
*Assistant Examiner* — Sharrief Broome

(57) ABSTRACT

Provided is a reversible electrochemical mirror including a first substrate, a second substrate on the first substrate and spaced apart from the first substrate, a first transparent electrode on the first substrate, a second transparent electrode under the second substrate, a semi-transmissive film between the second substrate and the second transparent electrode, a barrier rib having a chamber between the first and second transparent electrode and an electrolyte solution filled in the chamber.

17 Claims, 7 Drawing Sheets

(56) References Cited

U.S. PATENT DOCUMENTS

| | | |
|---|---|---|
| 7,508,568 B2 | 3/2009 | Lin et al. |
| 2002/0080463 A1* | 6/2002 | Tonar ............... B60Q 1/2665 |
| | | 359/267 |
| 2009/0021822 A1* | 1/2009 | Ikeda ................. G02F 1/153 |
| | | 359/267 |
| 2009/0323155 A1* | 12/2009 | Phillips ............... G02F 1/153 |
| | | 359/265 |
| 2011/0058244 A1* | 3/2011 | Kobayashi ........... G02F 1/1533 |
| | | 359/270 |
| 2011/0181939 A1* | 7/2011 | Bressand .......... B32B 17/10036 |
| | | 359/270 |
| 2014/0002881 A1 | 1/2014 | Kim |
| 2014/0042475 A1 | 2/2014 | Park et al. |

OTHER PUBLICATIONS

Shingo Araki et al., "Electrochemical Optical-Modulation Deveice with Reversible Transformation Between Transparent, Mirror, and Black", Advanced Optical Materials, 2012, pp. OP122-OP126, vol. 24, WILEY-VCH Verlag GmbH & Co. KGaA, Weinheim.

* cited by examiner

FIG. 5

|  | Red | Green | Blue |
|---|---|---|---|
| ITO thickness (nm) | 150 | 230 | 190 |
| Center wavelength of Spectrum (nm) | 710 | 530 | 460 |

REVERSIBLE ELECTROCHEMICAL MIRROR

CROSS-REFERENCE TO RELATED APPLICATION

This U.S. non-provisional patent application claims priority under 35 U.S.C. §119 to Korean Patent Application No. 10-2014-0167573, filed on Nov. 27, 2014, the entire contents of which are hereby incorporated by reference.

BACKGROUND

The present invention herein relates to a reversible electrochemical mirror, and more particularly, to a reversible electrochemical mirror having a thermal insulation property and being able to realizing a color in a mirror state.

Today, a smart window capable of improving indoor energy saving, adjusting transmittance and requiring a sense of beauty is receiving a lot of attention.

A recent smart window uses a low emission (low-E) glass or an existing reversible electrochemical mirror (REM) device. The low-E glass has an improved thermal insulation property, but has difficulties in changing transmittance in a visible light region and in realizing a variety of colors and fails to change a color. The existing REM device has limitations in thermal insulation property and electrochromic property.

SUMMARY

The present invention provides a reversible electrochemical mirror capable of adjusting a color, transmittance, and a reflectance.

The object of the present invention is not limited to the aforesaid, but other objects not described herein will be clearly understood by those skilled in the art from descriptions below.

Embodiments of the present invention provide reversible electrochemical mirrors including: a first substrate; a second substrate on the first substrate and spaced apart from the first substrate; a first transparent electrode on the first substrate; a second transparent electrode under the second substrate; a semi-transmissive film between the second substrate and the second transparent electrode; a barrier rib between the first and second transparent electrode, the barrier rib having a chamber; and an electrolyte solution filled in the chamber.

In some embodiments, the electrolyte solution may include a mirror metal, a solvent and an electrolyte. In other embodiments, the mirror metal may include Ag and Cu. In still other embodiments, a molar concentration ratio of Ag may be larger than that of Cu in the mirror metal. In even other embodiments, the solvent may include water, dimethyl sulfoxide, ethylene glycol, gamma butyrolactone, dimethylformamide or a mixture thereof. In yet other embodiments, the electrolytic solution may include a halide or a pseudohalide. In further embodiments, a metal layer may be electro-deposited on a surface of the second electrode when a negative potential is applied to the second transparent electrode. In still further embodiments, the mirror metal may include Ag and Cu.

In even further embodiments, the first and second transparent electrodes may include ITO or FTO. In yet further embodiments, the thickness of the second transparent electrode may range from 100 nm to 500 nm.

In much further embodiments, the semi-transmissive film may include a metal thin film. In still much further embodiments, the metal thin film may include tungsten. In even much further embodiments, the thickness of metal thin film may range from 4 nm to 12 nm.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 5 is a table showing the wavelength of a reflected light according to the thickness of the transparent electrode of a reversible electrochemical mirror according to an embodiment of the present invention.

DETAILED DESCRIPTION OF THE EMBODIMENTS

Figure 1:
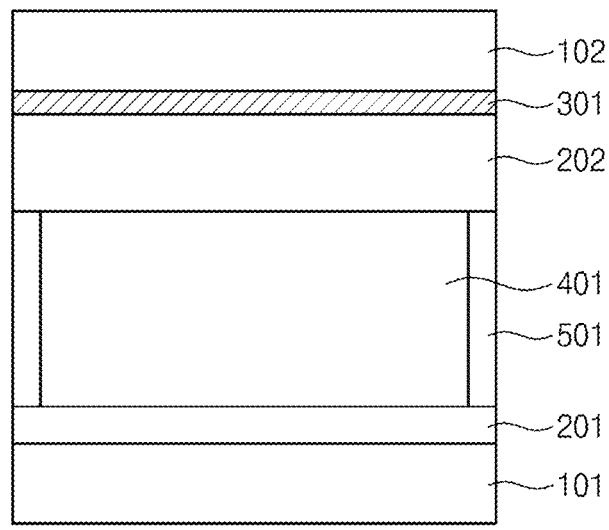
FIG. 1 illustrates a cross-sectional view of a reversible electrochemical mirror in an off-state according to an embodiment of the present invention.

Hereinafter, the present invention will be described by explaining preferred embodiments of the present invention with reference to the attached drawings in order to gain a sufficient understanding of the constitution and effect of the present invention. The present invention may, however, be embodied in different forms and variously modified and should not be construed as limited to the embodiments set forth herein. Rather, these embodiments are provided so that this disclosure will be thorough and complete, and will fully convey the scope of the present invention to those skilled in the art. Those skilled in the art will appreciate that the concept of the present invention may be carried out in a certain suitable environment.

In the following description, terms are used only for explaining a specific exemplary embodiment while not limiting the present invention. The terms of a singular form may include plural forms unless referred to the contrary. The meaning of "include," "comprise," "including," or "comprising," specifies a component, a step, an operation and/or a device but does not exclude other components, steps, operations and/or devices.

In the specification, it will be understood that when a layer (or film) is referred to as being 'on' another layer or substrate, it can be directly on the other layer or substrate, or intervening layers may also be present.

Although the terms, such as first, second, and third may be used herein to describe various regions, surfaces (or layers), and the like, the regions, surfaces (or layers), and the like should not be limited by these terms. These terms are used only to discriminate one region or layer from another region or layer. Therefore, a surface referred to as a first surface in one embodiment can be referred to as a second surface in another embodiment. An embodiment described and exemplified herein includes a complementary embodiment thereof. Like reference numerals refer to like elements throughout the specification.

The terms used in embodiments of the present invention can be interpreted as meaning commonly known to those skilled in the art unless defined otherwise.

Hereinafter, exemplary embodiments of the present invention will be described in detail with reference to the accompanying drawings.

The present invention relates to a reversible electrochemical mirror capable of adjusting a color, transmittance, and reflectance. More preferably, the reversible electrochemical mirror according to an embodiment of the present invention uses an Ag—Cu based solution as an electrolyte solution, and may include a semi-transmissive film between a substrate and a transparent electrode.

FIG. 1 illustrates a cross-sectional view of a reversible electrochemical mirror in an off-state according to an embodiment of the present invention. Referring to FIG. 1, a reversible electrochemical mirror includes a first substrate 101, a second substrate 102 disposed on the first substrate 101 and spaced apart from on the first substrate 101, a first transparent electrode 201 disposed on the first substrate 101, a second transparent electrode 202 disposed under the second substrate 102, a semi-transmissive film 301 disposed between the second substrate 102 and the second transparent electrode 202, and an electrolyte solution 401 between the first and second transparent electrode 201 and 202. The reversible electrochemical mirror may further include a barrier rib 501. The barrier rib 501 provides a chamber filled with the electrolyte solution 401.

The first and second substrates 101 and 102 may be transparent substrates. For example, the transparent substrate may be a glass substrate or a plastic substrate.

The first and second transparent substrates 201 and 202 may be indium tin oxide (ITO) or fluorine-doped tin oxide (FTO). The thickness of the first transparent electrode 201 may be about 50 μm. The thickness of the second transparent electrode 202 may range from about 100 nm to about 500 nm.

The semi-transmissive film 301 may include a metal thin film. For example, the semi-transmissive film 301 may be a tungsten thin film. The thickness of the metal thin film may range from about 4 nm to about 12 nm. The semi-transmissive film 301 may generate constructive interference of an incident light. For example, the incident light is subjected to constructive interference to exhibit transmittance of about 40% to about 50%. Reflectance of the semi-transmissive film 301 may be high with respect to a light in the infrared region.

The electrolyte solution 401 may include a mirror metal, a solvent, and an electrolyte. The mirror metal may include Ag (for example, may be provided through $AgNO_3$) or Cu (for example, Cu may be provided through $CuCl_2$). For example, a molar concentration ratio of Ag and Cu may be about 5:1. The solvent may include water, dimethyl sulfoxide (DMSO), ethylene glycol (EG), γ-butyrolactone (GBL), dimethyl formamide (DMF), or a mixture thereof. The electrolyte solution may include a halide or pseudohalide. For example, the electrolyte may be tetra-n-butylammonium bromide (TBABr) or tetra-n-butylammonium perchlorate (TBAP). The electrolyte solution 401 may further include a gelling agent. For example, the gelling agent may be poly vinyl butyral (a PVB).

Figure 2:
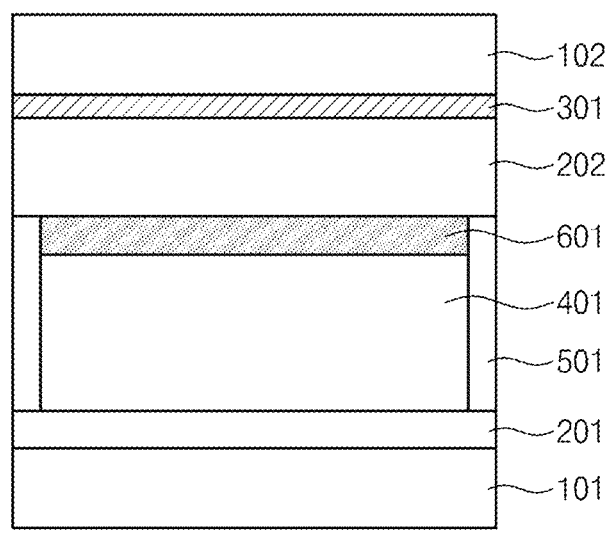
FIG. 2 illustrates a cross-sectional view of a reversible electrochemical mirror in an on-state according to an embodiment of the present invention.

FIG. 2 illustrates a cross-sectional view of a reversible electrochemical mirror in an on-state according to an embodiment of the present invention. Referring to FIG. 2, when the reversible electrochemical mirror becomes an on-state (for example, a state in which about −2.5 V is applied to the second transparent electrode 202 across both ends of the first and second electrodes 201 and 202), the electrolyte solution 401 may form a metal layer 601 on a surface of the second transparent electrode 202. For example, when a negative potential (for example, a voltage of about −2.5V) is applied to the second transparent electrode 202, the metal layer 601 including Ag and Cu may be electro-deposited on the surface of the second transparent electrode 202. The thickness of the electro-deposited thin film may range from about 80 nm to about 90 nm. The second transparent electrode 202 and the metal layer 601 may function as a mirror.

Figure 3A:
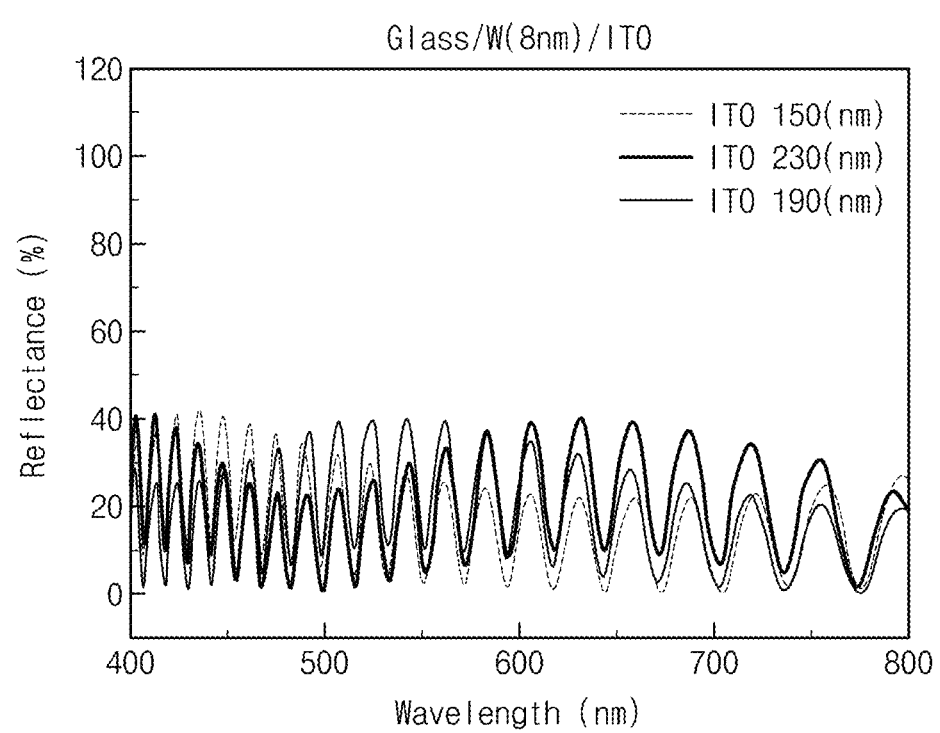
FIG. 3A is a graph showing reflectance of a reversible electrochemical mirror in an off-state according to an embodiment of the present invention.
Figure 3B:
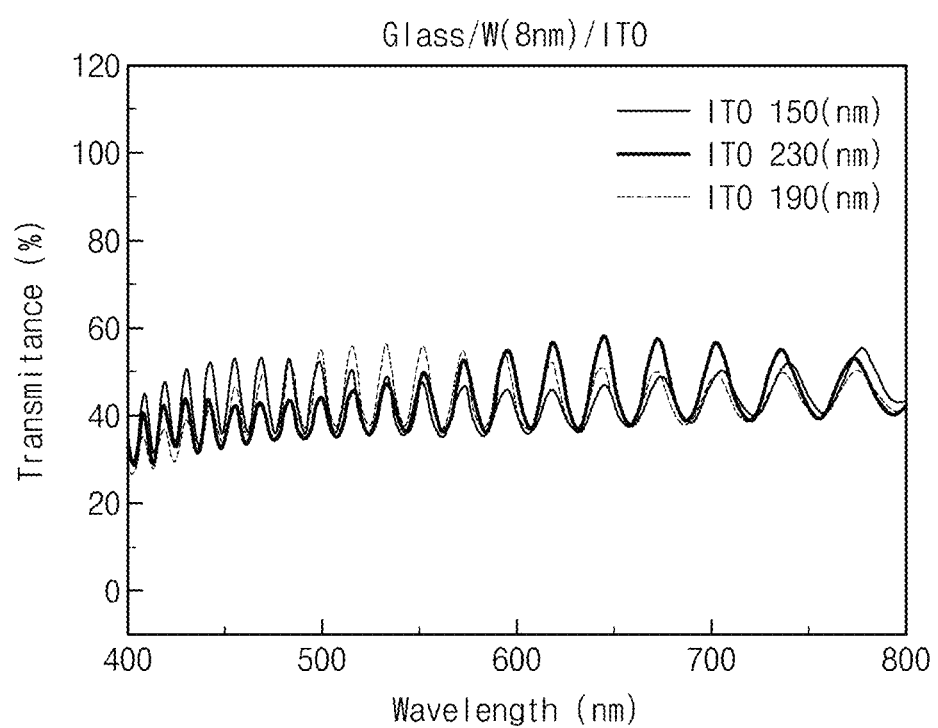
FIG. 3B is a graph showing transmittance of a reversible electrochemical mirror in an off-state according to an embodiment of the present invention.

FIGS. 3A and 3B are graphs showing reflectance and transmittance of a reversible electrochemical mirror in an off-state according to an embodiment of the present invention. Referring to FIGS. 3A and 3B, the reversible electrochemical mirror may be semi-transmissive in the off-state (for example, a state in which about 0 to about +0.5V is applied to the second transparent electrode 202 across both ends of the first and second electrodes 201 and 202). For example, the reversible electrochemical mirror may have transmittance of about 40% to about 50%. For example, the reversible electrochemical mirror may have a reflectance of about 0% to about 40%. The reversible electrochemical mirror in the off-state may function as a semi-permeable mirror.

Figure 4A:
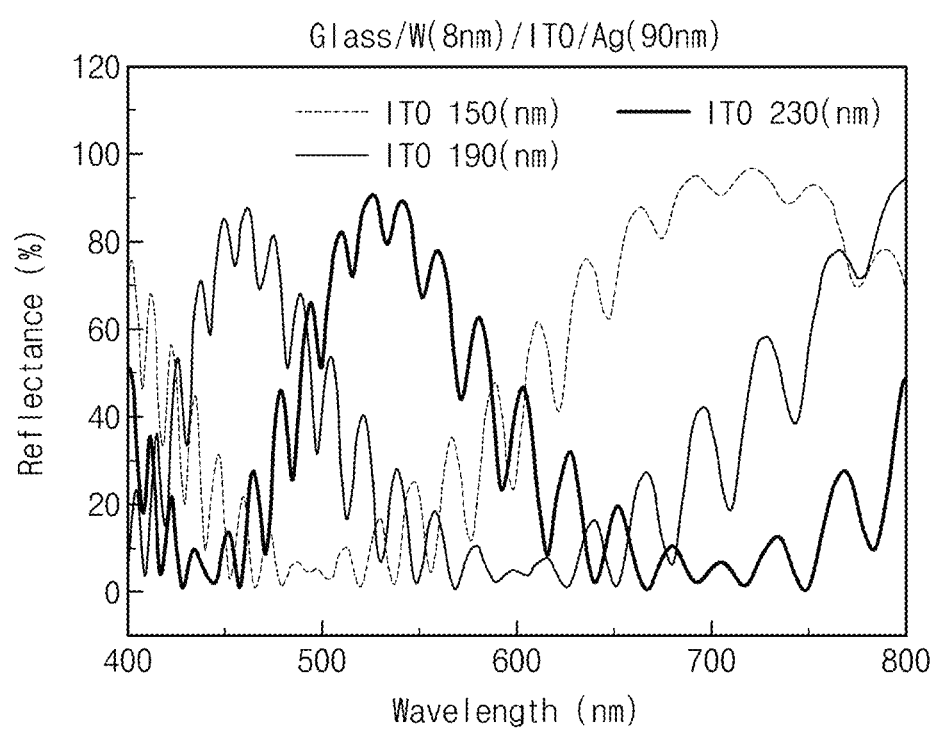
FIG. 4A is a graph showing reflectance of a reversible electrochemical mirror in an on-state according to an embodiment of the present invention.
Figure 4B:
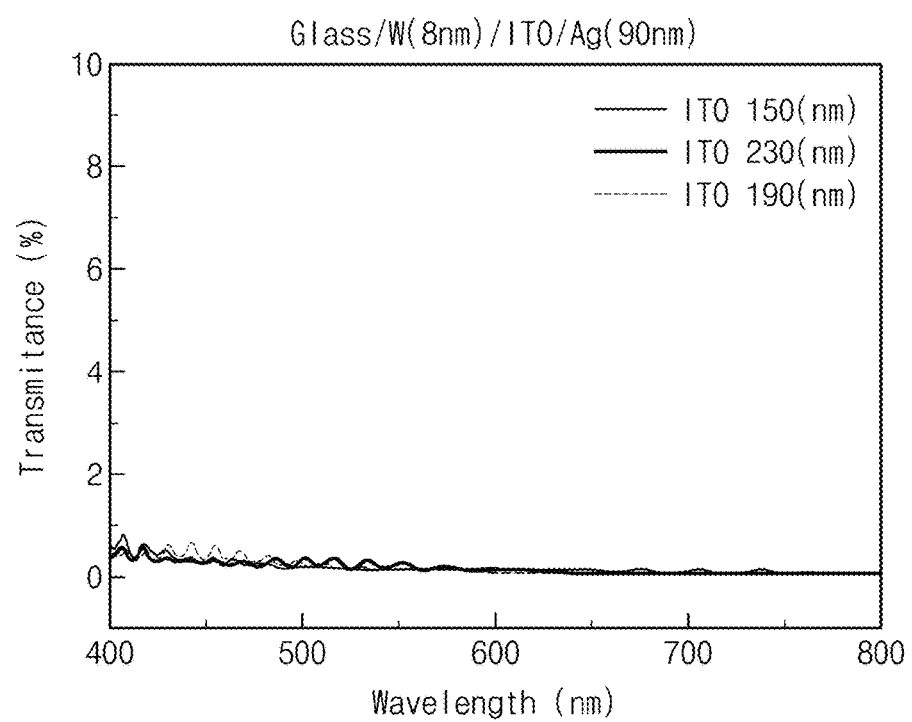
FIG. 4B is a graph showing transmittance of a reversible electrochemical mirror in an on-state according to an embodiment of the present invention.

FIGS. 4A and 4B are graphs showing reflectance and transmittance of a reversible electrochemical mirror in an on-state according to an embodiment of the present invention. Referring to FIG. 4B, the reversible electrochemical mirror may be opaque in the on-state (for example, a state in which about −2.5V is applied to the second transparent electrode 202 across both ends of the first and second electrodes 201 and 202). For example, the reversible electrochemical mirror may have transmittance of about 0% to about 1%.

FIG. 5 is a table showing the wavelength of a reflected light according to the thickness of the second transparent electrode 202. At this time, the semi-transmissive film is tungsten having the thickness of about 8 nm. Referring to FIGS. 4A and 5, the reversible electrochemical mirror may reflect a visible light of a specific wavelength according to the thickness of the second transparent electrode 202 in the on-state (for example, a state in which about −2.5V is applied to the second transparent electrode 202 across both ends of the first and second electrodes 201 and 202). The reversible electrochemical mirror having the second transparent electrode 202 with the thickness of about 140 nm to about 160 nm may reflect a red light (for example, wavelength of about 710 nm). For example, the reversible electrochemical mirror may have reflectance of about 80% or more in a range of the red light. The reversible electrochemical mirror having the second transparent electrode 202 with the thickness of about 220 nm to about 240 nm may reflect a green light (for example, wavelength of about 530 nm). For example, the reversible electrochemical mirror may have reflectance of about 80% or more in a range of the green light. The reversible electrochemical mirror having the second transparent electrode 202 with the thickness of about 180 nm to about 200 nm may reflect a blue light (for example, wavelength of about 460 nm). For example, the reversible electrochemical mirror may have reflectance of about 80% or more in a range of the blue light. The reversible electrochemical mirror in the on-state may function as a color mirror.

Figure 6:
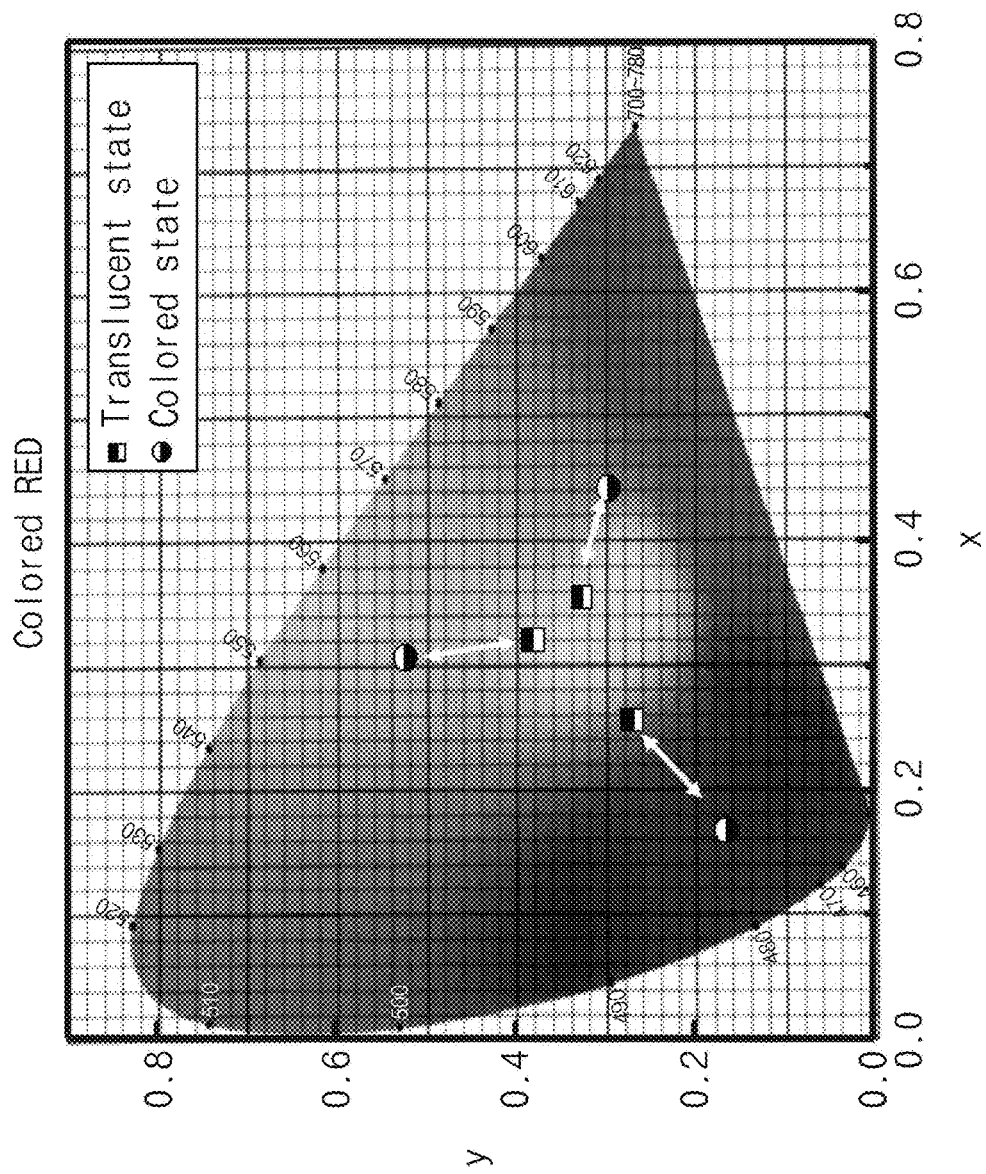
FIG. 6 shows a graph of a color coordinate of a reversible electrochemical mirror according to an embodiment of the present invention.

FIG. 6 shows a color coordinate graph of a reversible electrochemical mirror according to an embodiment of the present invention. Referring to FIG. 6, transparency of a color in the reversible electrochemical mirror may change according to an applied voltage.

The embodiments described herein are merely provided as examples with the drawings in order to improve a more thorough understanding of the present invention, and therefore should not be construed as limiting the present invention. Moreover, it will be understood that various changes and modifications may be made by those skilled in the art of the present invention without departing from the basic principles of the present invention.

What is claimed is:

1. A reversible electrochemical mirror comprising:
   a first substrate;
   a second substrate on the first substrate and spaced apart from the first substrate;
   a first transparent electrode on the first substrate;
   a second transparent electrode under the second substrate;
   a metal thin film between the second substrate and the second transparent electrode;
   a barrier rib between the first and second transparent electrode, the barrier rib having a chamber; and
   an electrolyte solution filled in the chamber,
   wherein the reversible electrochemical mirror transmits less than 2% of visible light in an off state, and
   wherein the reversible electrochemical mirror transmits more than 20% of visible light in an on state.

2. The reversible electrochemical mirror of claim 1, wherein the metal thin film includes tungsten.

3. The reversible electrochemical mirror of claim 2, wherein the metal thin film has a thickness ranging from about 4 nm to about 12 nm.

4. The reversible electrochemical mirror of claim 1, wherein the first and second transparent electrodes include indium tin oxide (ITO) or fluorine-doped tin oxide (FTO).

5. The reversible electrochemical mirror of claim 4, wherein the second transparent electrode has a thickness ranging from about 100 nm to about 500 nm.

6. The reversible electrochemical mirror of claim 5, wherein the second transparent electrode has a thickness ranging from 140 nm to 160 nm, and
   the reversible electrochemical mirror reflects a red light.

7. The reversible electrochemical mirror of claim 5, wherein the second transparent electrode has a thickness ranging from about 220 nm to about 240 nm, and
   the reversible electrochemical mirror reflects a green light.

8. The reversible electrochemical mirror of claim 5, wherein the second transparent electrode has a thickness ranging from about 180 nm to about 200 nm, and
   the reversible electrochemical mirror reflects a blue light.

9. The reversible electrochemical mirror of claim 1, wherein the electrolyte solution includes a mirror metal, a solvent, and an electrolyte.

10. The reversible electrochemical mirror of claim 9, wherein the mirror metal includes Ag and Cu.

11. The reversible electrochemical mirror of claim 10, wherein a molar concentration ratio of Ag is larger than that of Cu in the mirror metal.

12. The reversible electrochemical mirror of claim 9, wherein the solvent includes water, dimethyl sulfoxide, ethylene glycol, gamma butyrolactone, dimethylformamide, or a mixture thereof.

13. The reversible electrochemical mirror of claim 9, wherein the electrolyte solution includes a halide or pseudohalide.

14. The reversible electrochemical mirror of claim 9, wherein a metal layer is electro-deposited on a surface of the second electrode when a negative potential is applied to the second transparent electrode.

15. The reversible electrochemical mirror of claim 14, wherein the metal layer includes Ag and Cu.

16. The reversible electrochemical mirror of claim 1, further comprising a plurality of chambers arranged in a two-dimensional array, wherein the reversible electrochemical mirror only has a single layer of the chambers.

17. The reversible electrochemical mirror of claim 1, wherein the only layer between the electrolytic solution and the thin metal film is the second transparent electrode.

* * * * *